Sept. 15, 1925.
J. BELL
1,554,064
AUTOMOBILE TRANSMISSION MECHANISM
Filed March 13, 1924  2 Sheets-Sheet 1
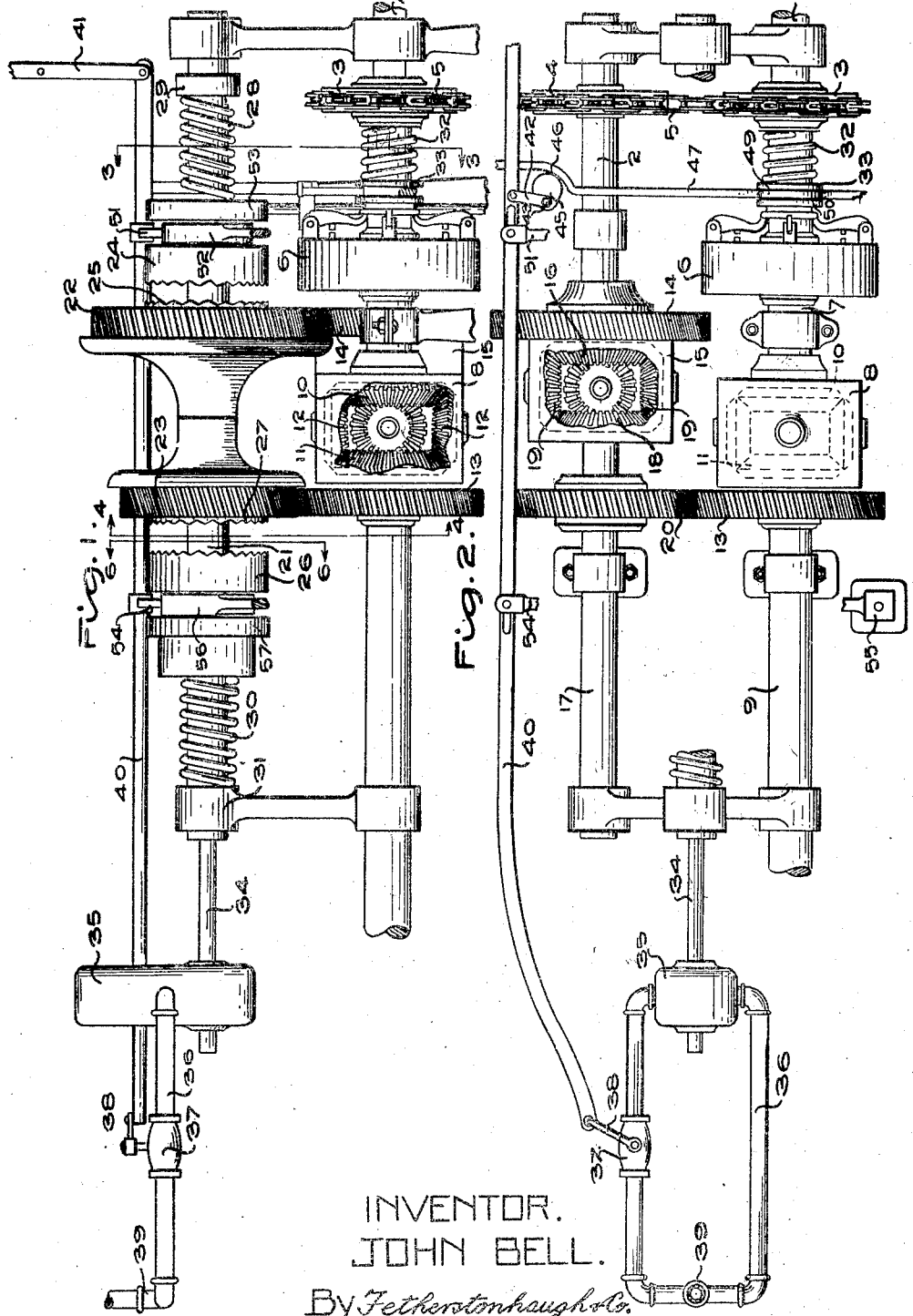
INVENTOR.
JOHN BELL.
By Fetherstonhaugh & Co.
ATTYS.

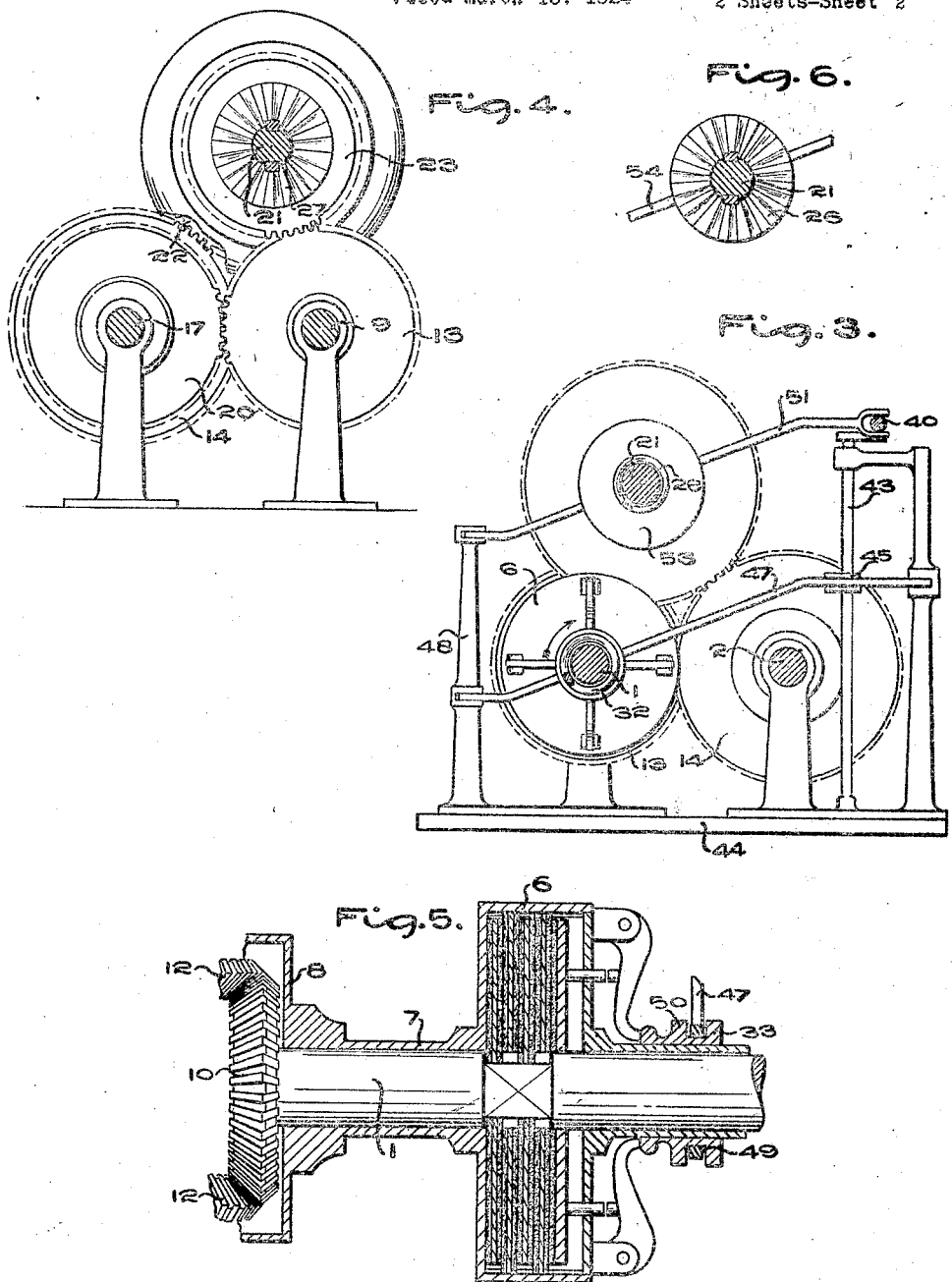

Patented Sept. 15, 1925.

1,554,064

UNITED STATES PATENT OFFICE.

JOHN BELL, OF NELSON, BRITISH COLUMBIA, CANADA.

AUTOMOBILE TRANSMISSION MECHANISM.

Application filed March 13, 1924. Serial No. 699,078.

*To all whom it may concern:*

Be it known that I, JOHN BELL, a subject of the King of Great Britain, and a resident of the city of Nelson, in the Province of British Columbia, Canada, have invented certain new and useful Improvements in Automobile Transmission Mechanism, of which the following is the specification.

My invention relates to improvements in automobile transmission mechanism and the object of the invention is to devise a hydraulically controlled mechanism that will give a wide range of speed variations both in forward and reverse directions.

A further object is to devise means for controlling the clutch mechanism hydraulically.

A still further object is to devise a transmission in which all the gears are continually in mesh.

My invention consists of a transmission constructed and arranged all as hereinafter more particularly described and illustrated in the accompanying drawing in which:

Fig. 1 represents a side elevation of my transmission.

Fig. 2 is a plan view thereof with the forward part of the upper shaft and its attached gears removed.

Fig. 3 is a vertical section through the line 3—3 Figure 1.

Fig. 4 is a vertical section through the line 4—4 Figure 1.

Fig. 5 is a longitudinal vertical section through the disc clutch, and

Fig. 6 is a vertical section through the line 6—6 Figure 1.

Like characters of reference indicate corresponding parts in the different views.

1 is the engine shaft and 2 is a counter shaft. 3 is a sprocket secured to the engine shaft and 4 is a sprocket secured to the counter shaft 2. 5 is a chain connecting the two sprockets 3 and 4 together. 6 is a disc clutch adapted to connect the engine shaft 1 to the rotatable sleeve 7 thereon. The rear end of the sleeve 7 carries the housing 8 which is rotatably mounted on the forward end of the propeller shaft 9. 10 is a bevelled gear secured to the rear end of the engine shaft 1 and 11 is an opposed bevelled gear secured to the forward end of the propeller shaft 9, said gears being connected together by the pinions 12 journalled in the housing 8. 13 is a gear rotatable on the shaft 9 and secured to the housing 8.

14 is a gear revolubly mounted on the counter shaft 2 and secured at its rear face to the housing 15. 16 is a bevelled gear secured to the rear end of the counter shaft 2. 17 is a shaft in axial alignment with the shaft 2 and provided at its forward end with a bevelled gear 18, said bevelled gear 18 and the bevelled gear 16 being connected together by means of the pinions 19 journalled in the housing 15. 20 is a gear secured to the shaft 17 and adapted to mesh with the gear 13.

21 is a fluted control shaft longitudinally positioned above the shafts 1, 2, 9 and 17. 22 is a gear rotatably mounted on the shaft 21 and adapted to mesh with the gear 14 on the shaft 2. 23 is a gear freely mounted on the shaft 21 and adapted to mesh with the gear 13. 24 is a dog clutch slidably secured to the shaft 21 and adapted to mesh with the toothed face 25 of the gear 22. 26 is a second dog clutch slidably secured to the shaft 21, to the rear of the gear 23 and adapted to coact with the face 27 of such gear. 28 is a spiral spring on the forward end of the shaft 21 positioned between the dog clutch 24 and the collar 29 which is secured to such shaft 21. 30 is a spiral spring on the shaft 21 positioned between the dog clutch 26 and the rear bearing 31 of such shaft. 32 is a spiral spring on the shaft 1 positioned between the sprocket 3 and the movable element 33 of the disc clutch.

34 is a shaft secured to the rear end of the shaft 21 and in axial alignment therewith, said shaft 34 being provided with a suitable braking mechanism, such as the rotary motor 35, the shaft 34 being connected to its rotor and the inlets and outlets from the motor casing being connected together by means of the pipe 36 in which is inserted the valve 37 adapted to be actuated by the lever 38.

39 is a filler pipe connected to the pipe 36 for filling the same with water or other liquid. 40 is a longitudinally extending rod the forward end being pivotally connected to the control lever 41 within reach of the driver of the car. Intermediately of the length of the rod 40 a horizontally extending link 42 is provided pivotally connected at one end to such rod and the other end secured to the vertical spindle 43 which is rotatably mounted on the transverse member 44. 45 is a cam secured to the spindle and adapted to engage the cam face 46 on the curved rod 47 which is pivoted at one end to the bracket 48, said rod having an annular intermediate portion 49 disposed between the spaced apart collar 50 and the movable element 33 of the disc clutch mechanism 6.

51 is a transversely extending rod pivotally connected at one end to the longitudinally extending rod 40 and at the other end to the bracket 48, said rod 51 having an annular intermediate portion 52 adapted to be positioned between the dog clutch 24 and the spaced apart collar 53. A similar rod 54 is provided secured in exactly the same manner to the rod 40 and to the bracket 55, said rod having an annular intermediate portion 56 positioned between the dog clutch 27 and the spaced apart collar 57.

The rear end of the rod 40 is pivotally connected to the lever 38 of the valve 37.

The operation of my device is as follows:

When it is desired to drive the automobile in a forward direction the lever 41 is gradually pushed forwardly until the valve 37 is closed, when the engine shaft 1 will drive the propeller shaft 9 at the same speed or on direct drive as will hereinafter be more particularly explained.

Assuming that the engine shaft is rotating in a clockwise direction as indicated by the arrow in Figure 3 the sprocket chain 5 will drive the counter shaft 2 in a clockwise direction and consequently drive the bevelled gear 16 in the same direction. The weight of the car will tend to retard the gear 18 to slow rotation and thus the housing 15 will rotate in a clockwise direction, thus rotating the gear 14 in the same direction and rotating the intermeshing gear 22 in the reverse direction. On the control lever 41 being pushed forwardly the control rod will be pushed rearwardly, thus permitting the dog clutch 24 to be thrown into engagement with the face 25 of the gear 22 under the influence of the spring 28, consequently rotating the control shaft 21 in an anti-clockwise direction. As the pushing of the rod 40 gradually closes the valve 37 it will be seen that the speed of the rotation of the shaft 34 and its attached control shaft 21 will be gradually reduced, thus reducing the speed of the gear 22 with the consequent reduction in the speed of the gear 14. When this occurs the bevelled gear 16 commences to rotate the bevelled gear 18 through the medium of the pinions 19 and thus the shaft 17 is rotated in an anticlockwise direction and consequently through the medium of the gears 20 and 13 the propeller shaft 9 will be rotated in a clockwise direction. The more the shaft 21 is retarded by the closing of the valve 37, the nearer will the speed of the propeller shaft 9 be to the speed of the engine shaft 1 and when the valve 37 is fully closed and the control shaft 21 stopped, the propeller shaft 9 will be running at the same speed as the shaft 1 or on direct drive. This is achieved by the disc clutch 6 coming into its operative position when the valve 37 is fully closed. As the control rod 40 moves into its valve closing position the link 42 swings the spindle 43 and the attached eccentric 45, thus allowing the rearward movement of the rod 47 which will permit the spring 32 to push the movable element 33 of the clutch rearwardly and thus provide an operable connection between the shaft 1 and the sleeve 7 and attached housing 8. As the housing 8 is rotating in a clockwise direction at the same speed as the engine shaft it will be seen that there is no relative movement between the pinions 12 and the rotating bevelled gear 10 which is positively rotated by the engine shaft. Thus a positive drive will be achieved between the bevelled gear 10 and the bevelled gear 11 attached to the propeller shaft with the result that the propeller shaft will be rotated in a clockwise direction at the same speed as the engine shaft. From the following it will be seen that the car can be conveniently started in forward motion by closing valve 37 which acting through the dog clutch on wheel 22 meshing with wheel 14 causes the wheel 14 to be brought to a stop. This causes shaft 17 and wheel 20 to revolve in an anticlockwise direction and wheel 20 being in mesh with wheel 13 will cause the wheel 13 to revolve in a clockwise direction with shaft 9 revolving at the same speed as shaft 1 and then when clutch 6 goes into action all the wheels will be permitted to idle.

In reversing the car the hand lever 41 is moved rearwardly, thus pulling the rod 40 forwardly and throwing the dog clutch 26 into engagement with the face 27 of the gear 23, thus establishing an operative connection between the gear 23 and the shaft 21. When the valve 37 is fully opened the shaft 21 will thus be free to rotate when driven by the gear 13 which is secured to the housing 8. In this case the gear 10 rotating in a clockwise direction will rotate the housing and thus there will be no rotation imparted to the gear 11 but as the rotation of the gear 13 is retarded by closing the valve 37 through pulling the rod 40 further forward, the rotation of the housing 8 will be retarded and thus through the medium of the pinions 12 the bevelled gear 10 will drive the bevelled gear 11 in an anti-clockwise direction at a speed equivalent to the degree the speed of the rotation of the housing is retarded. The aforesaid operation of reversing the car may be briefly summed up as follows: When wheel 23 which is in mesh with wheel 13 is stopped by the action of valve 37 the dog clutch 26 on wheel 23 will cause shaft 9 to revolve anti-clockwise at the same speed as shaft 1 revolves clockwise.

What I claim as my invention is—

1. In an automobile transmission, the combination with the engine and propeller shafts, of differential mechanism between the engine and propeller shaft, a pair of counter shafts in axial alignment, one of the counter shafts driven from the engine shaft, a differential mechanism between the counter shafts, and means on the other counter shaft coacting with the differential mechanism between the engine and propeller shafts for varying the speed ratio of the propeller shaft relatively to the engine shaft.

2. In an automobile transmission, the combination with the engine and propeller shafts, of differential mechanism between the engine and propeller shaft, a pair of counter shafts in axial alignment, one of the counter shafts driven from the engine shaft, a differential mechanism between the counter shafts, a rotatable control shaft, means on the control shaft coacting with the differential mechanism between the counter shafts for varying the speed ratio of the counter shafts, means on one of the counter shafts coacting with the differential mechanism between the propeller shafts, and means for retarding the speed of rotation of the control shaft, the speed variations between the counter shafts being dependent upon the degree of retardation of the control shaft.

3. In an automobile transmission, the combination with the engine and propeller shafts, of differential mechanism between the engine and propeller shaft, a pair of counter shafts in axial alignment, one of the counter shafts driven from the engine shaft, a differential mechanism between the counter shafts, a rotatable control shaft, means on the control shaft coacting with the differential mechanism between the counter shafts for varying the speed ratio of the counter shafts, means on one of the counter shafts coacting with the differential mechanism between the propeller shafts, and means for retarding the speed of rotation of the control shaft, the speed variations between the counter shafts being dependent upon the degree of retardation of the control shaft, means for stopping the control shaft, a clutch between the engine shaft and the differential mechanism between the engine shaft and propeller, and means for throwing in the clutch simultaneously with the stopping of the control whereby a direct drive is constituted between the engine and propeller shafts.

4. In an automobile transmission, the combination with the engine and propeller shafts, of differential mechanism between the engine and propeller shaft, a pair of counter shafts in axial alignment, one of the counter shafts driven from the engine shaft, a differential mechanism between the counter shafts, a rotatable control shaft, means on the control shaft coacting with the differential mechanism between the counter shafts for varying the speed ratio of the counter shafts, means on one of the counter shafts coacting with the differential mechanism between the propeller shafts, means for retarding the speed of rotation of the control shaft, the speed variations between the counter shafts being dependent upon the degree of retardation of the control shaft, and means on the control shaft coacting with the differential mechanism between the engine and propeller shafts for reversing the direction of rotation of the propeller shaft relatively to the engine shaft, the degree of retardation of the control shaft controlling the speed ratio in reverse of the engine shaft to the propeller shaft.

JNO. BELL.